(12) United States Patent
Bushey

(10) Patent No.: US 7,383,612 B2
(45) Date of Patent: Jun. 10, 2008

(54) CASTER WITH LOW MOUNTING CAPABILITY

(76) Inventor: Richard D. Bushey, 1596 38th Ave., Kenosha, WI (US) 53140

( * ) Notice: Subject to any disclaimer, the term of this patent is extended or adjusted under 35 U.S.C. 154(b) by 113 days.

(21) Appl. No.: 11/109,369

(22) Filed: Apr. 19, 2005

(65) Prior Publication Data

US 2006/0010645 A1   Jan. 19, 2006

Related U.S. Application Data

(60) Provisional application No. 60/587,670, filed on Jul. 14, 2004.

(51) Int. Cl.
B60B 11/00 (2006.01)
B60B 37/00 (2006.01)
A47L 9/00 (2006.01)
B62B 11/00 (2006.01)
B62B 1/00 (2006.01)

(52) U.S. Cl. ............... 16/29; 16/40; 16/18 R; 16/45; 280/47.34; 280/79.11

(58) Field of Classification Search .......... 16/29, 16/40, 18 R, 45, 47, 30, 31 R, 19; 280/47.34, 280/79.5, 79.3, 79.11, 47.131
See application file for complete search history.

(56) References Cited

U.S. PATENT DOCUMENTS

| | | | | |
|---|---|---|---|---|
| 8,180 A | * | 6/1851 | Jenkinson | 264/570 |
| 835,492 A | * | 11/1906 | Baker | 16/30 |
| 2,110,269 A | * | 3/1938 | Horvath | 16/24 |
| 2,529,390 A | * | 11/1950 | Hauer | 16/29 |
| 2,888,708 A | * | 6/1959 | Seidner | 16/105 |
| 2,911,666 A | * | 11/1959 | Schultz, Jr. | 16/40 |
| 3,639,942 A | * | 2/1972 | Ostrom | 16/29 |
| 4,187,578 A | * | 2/1980 | Little | 16/29 |
| 5,313,686 A | * | 5/1994 | Berfield | 15/323 |
| 5,480,169 A | * | 1/1996 | Wang | 280/37 |
| 6,324,724 B1 | * | 12/2001 | Reilly, Jr. | 16/29 |
| 6,386,560 B2 | * | 5/2002 | Calender | 280/47.34 |
| 6,701,570 B2 | * | 3/2004 | Henriott et al. | 16/29 |
| 6,840,359 B2 | * | 1/2005 | Godshaw | 190/18 A |
| 6,865,774 B2 | * | 3/2005 | Devine et al. | 16/18 R |
| 6,880,837 B2 | * | 4/2005 | Nandram et al. | 280/79.11 |

FOREIGN PATENT DOCUMENTS

JP    40604030 A   * 11/1994

* cited by examiner

*Primary Examiner*—Robert J Sandy
*Assistant Examiner*—David C Reese
(74) *Attorney, Agent, or Firm*—Boyle Fredrickson, S.C.

(57) ABSTRACT

A caster assembly is provided for supporting an object. The caster assembly includes a generally triangular landing for receiving the object thereon. The landing lies in a first plane. The caster assembly also includes first and second legs that lie in a second plane generally parallel to the first plane. The first and second legs are vertically spaced from the landing and each leg includes an upper surface and a lower surface. A first plurality of wheel assemblies are interconnected to the lower surface of the first leg and a second plurality of wheel assemblies are interconnected to the lower surface of the second leg.

13 Claims, 6 Drawing Sheets

CASTER WITH LOW MOUNTING CAPABILITY

CROSS-REFERENCE TO RELATED APPLICATIONS

This application claims the benefit of U.S. Provisional Application Ser. No. 60/587,670, filed Jul. 14, 2004.

FIELD OF THE INVENTION

This invention relates generally to casters, and in particular, to a caster assembly with a low mounting capability with respect to a supporting surface.

BACKGROUND OF THE INVENTION

As is known, caster wheels are often interconnected to various objects such as furniture, file cabinets, luggage and the like to facilitate the movement of the item along a supporting surface. While these objects are often manufactured with the caster wheels already mounted thereon, the pre-mounting of the caster wheels on an object presents certain unique problems. For example, in order to safely ship an object after the caster wheels have been attached thereto, specialized packaging must be used in order to prevent the caster wheels from being knocked off the article during shipment. This, in turn, increases the overall expense of the article.

In view of the foregoing, specialized mounting brackets have been developed to allow for the caster wheels to be attached and/or removed from the bottom surface of the object after the manufacture thereof. While functional for their intended purpose, there are certain inherent problems with the mounting of the caster wheels to the bottom surface of an item. For example, given the weight of certain items such as furniture, the mounting of the caster wheels to the bottom surface thereof may be difficult. Further, when used in connection with heavy objects, it is possible for the caster wheels to be dislodged from the bottom surface of the object as the object is transported over a supporting surface. Finally, space considerations may limit the ability of a user to place the caster wheels under the object due to the height of the caster wheels.

Therefore, it is a primary object and feature of the present invention to provide a caster assembly that is mountable on the bottom surface of an object and that has a low mounting capability with respect to a supporting surface on which the object resides.

It is a further object and feature of the present invention to provide a caster assembly that may be simply and easily connected to an object.

It is a still further object and feature of the present invention to provide a caster assembly that is mountable to the bottom surface of an object to allow the object to be transported over a supporting surface in a user desired direction.

In accordance with the present invention, a caster assembly is provided for supporting an object. The caster assembly includes a plurality of wheel assemblies and a landing supported by the caster wheels for receiving the object thereon. The landing lies in a first plane that extends through the caster wheels.

Each wheel assembly includes a corresponding caster wheel that is rotatable about a corresponding axis. The axes of the caster wheels lie in a common axes plane. The landing has a generally triangular configuration and includes first and second edges that are generally perpendicular to and intersect each other. A first sidewall extends from the first edge of the landing at angle generally perpendicular to the landing and terminates at an upper edge. A second sidewall extends from the second edge of the landing at angle generally perpendicular to the landing and terminates at an upper edge. A first leg extends from the upper edge of the first sidewall and lies in a second plane generally parallel to the first plane. The first leg has upper and lower surfaces. A second leg extends from the upper edge of the second sidewall and lies in the second plane. The second leg also has upper and lower surfaces. A first wheel assembly of the plurality of wheel assemblies is attached to the lower surface of the first leg and a second wheel assembly of the plurality of wheel assemblies is attached to the lower surface of the second leg.

In accordance with a further aspect of the present invention, a caster assembly is provided for supporting an object. The caster assembly includes a landing for receiving the object thereon. The landing lies in a first plane. The caster assembly also includes first and second legs that lie in a second plane generally parallel to the first plane. The first and second legs are vertically spaced from the landing and each leg includes an upper surface and a lower surface. A first wheel assembly is interconnected to the lower surface of the first leg and a second wheel assembly is interconnected to the lower surface of the second leg.

It is contemplated for the landing of the caster assembly to have a generally triangular configuration. In addition, the landing includes first and second edges that are generally perpendicular to and intersect each other. A first sidewall extends from the first edge of the landing at angle generally perpendicular to the landing and terminates at an upper edge. A second sidewall extends from the second edge of the landing at angle generally perpendicular to the landing and terminates at an upper edge. The first leg extends from the upper edge of the first sidewall and the second leg extends from the upper edge of the second sidewall.

In accordance with a still further aspect of the present invention, a caster assembly is provided for supporting an object. The caster assembly includes a generally triangular landing first and second edges that are generally perpendicular to and intersect each other. It is intended for the landing to receive the object thereon. A first sidewall extends from the first edge of the landing at angle generally perpendicular to the landing and terminates at an upper edge. A second sidewall extends from the second edge of the landing at angle generally perpendicular to the landing and terminates at an upper edge. A first leg extends from the upper edge of the first sidewall and lies in a second plane generally parallel to the first plane. The first leg has upper and lower surfaces. A second leg extends from the upper edge of the second sidewall and lies in the second plane. The second leg having upper and lower surfaces. A first wheel assembly is interconnected to the lower surface of the first leg and a second wheel assembly is interconnected to the lower surface of the second leg.

It is contemplated for the landing to lie in a first plane extending through the first and second wheel assemblies. Each wheel assembly includes a corresponding caster wheel that is rotatable about a corresponding axis. The axes of the caster wheels lie in a common axes plane.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE PREFERRED EMBODIMENT

Figure 1:
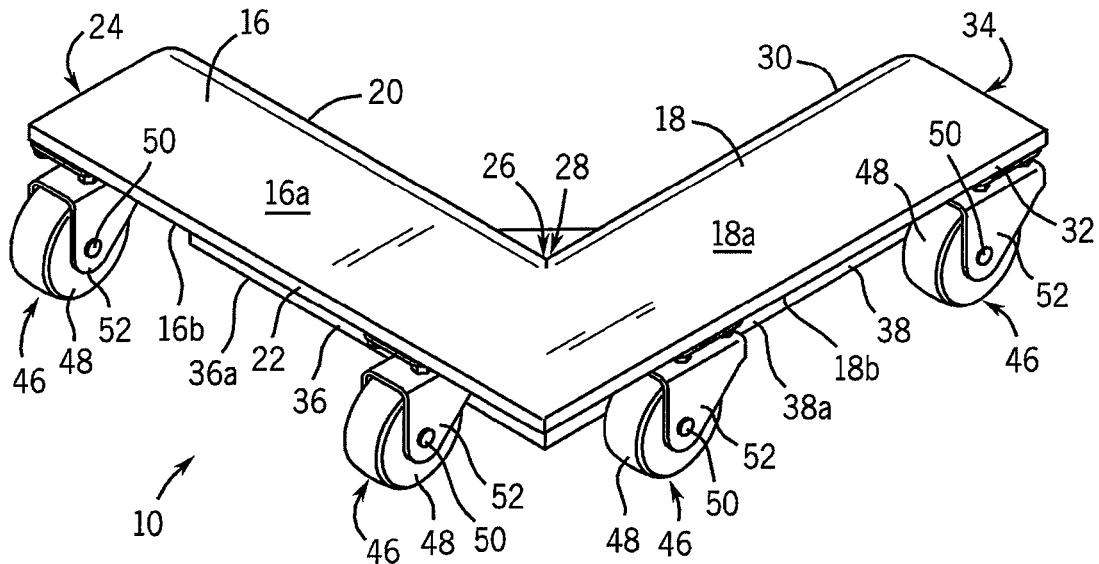
FIG. 1 is an isometric view of a caster assembly in accordance with the present invention.
Figure 2:
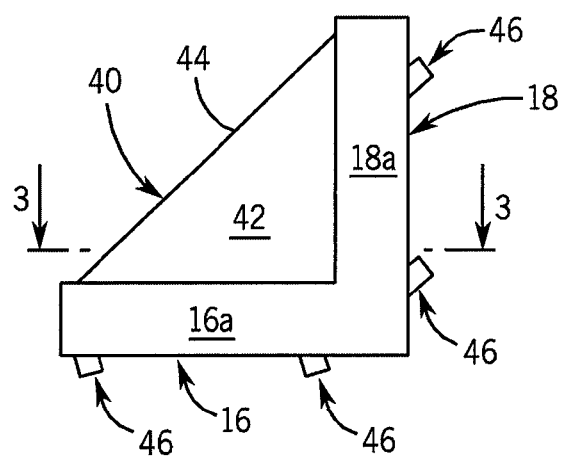
FIG. 2 is a top plan view of the caster assembly of FIG. 1.

Referring to FIGS. 1-4, a caster assembly in accordance with the present invention is generally designated by the reference numeral 10. It is intended that caster assembly 10 support object 12 such as furniture, luggage, file cabinets and the like, above a supporting surface 14.

Figure 3:
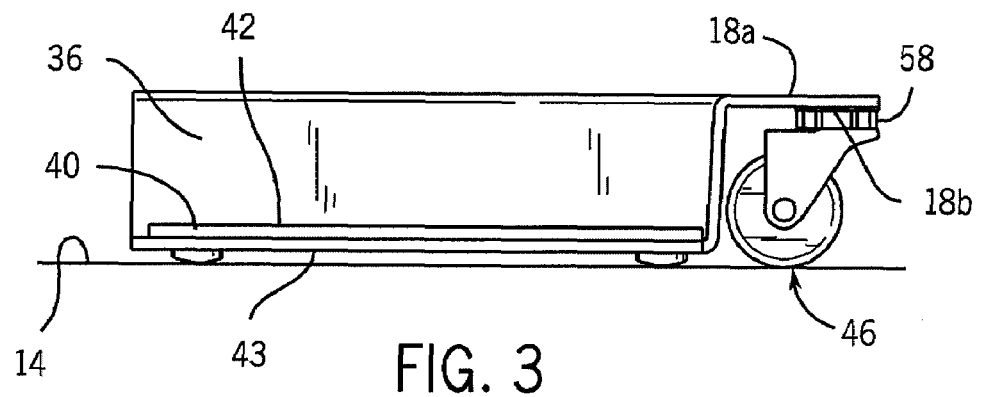
FIG. 3 is a cross-sectional view of the caster assembly of the present invention taken along line 3-3 of FIG. 2.
Figure 4:
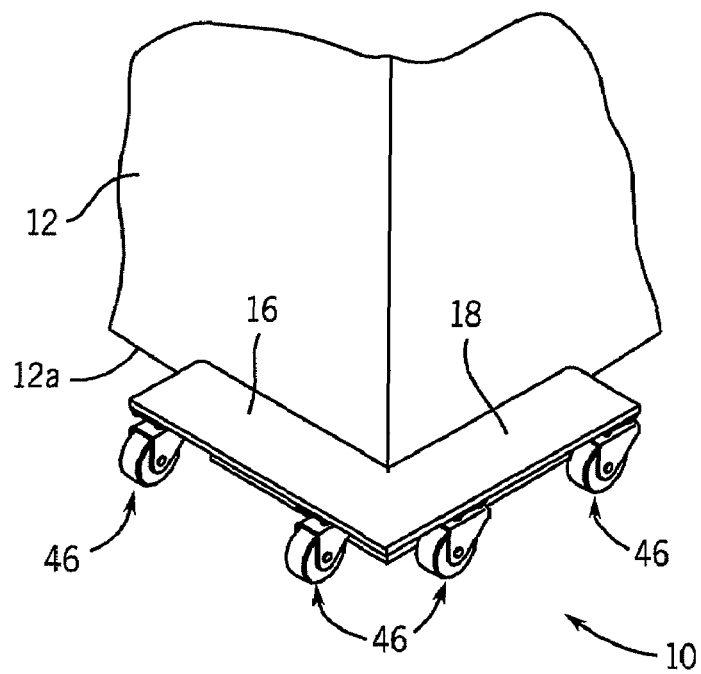
FIG. 4 is an isometric view of the caster assembly of the present invention supporting an object.
Figure 5:
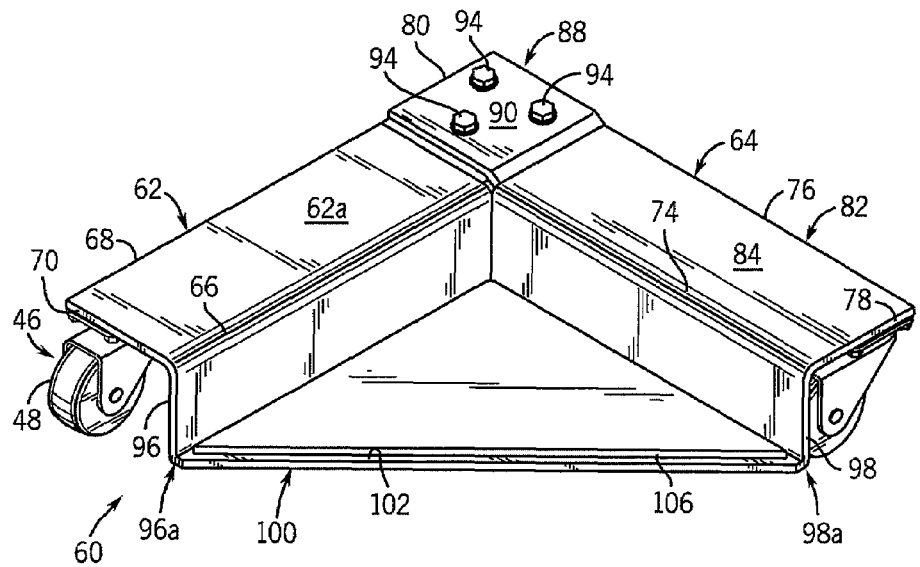
FIG. 5 is a front isometric view of an alternate embodiment of the caster assembly of the present invention.
Figure 6:
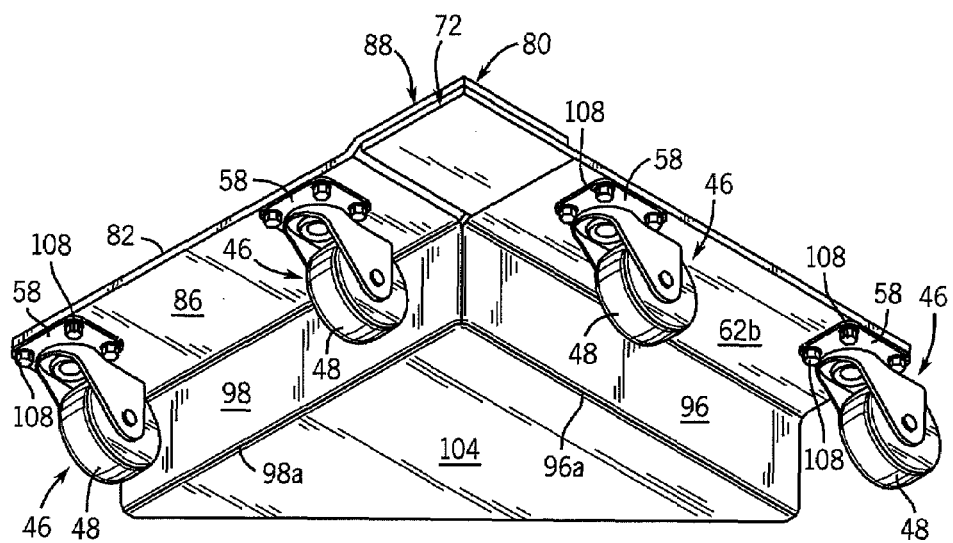
FIG. 6 is a rear isometric view of the caster assembly of FIG. 5.
Figure 7:
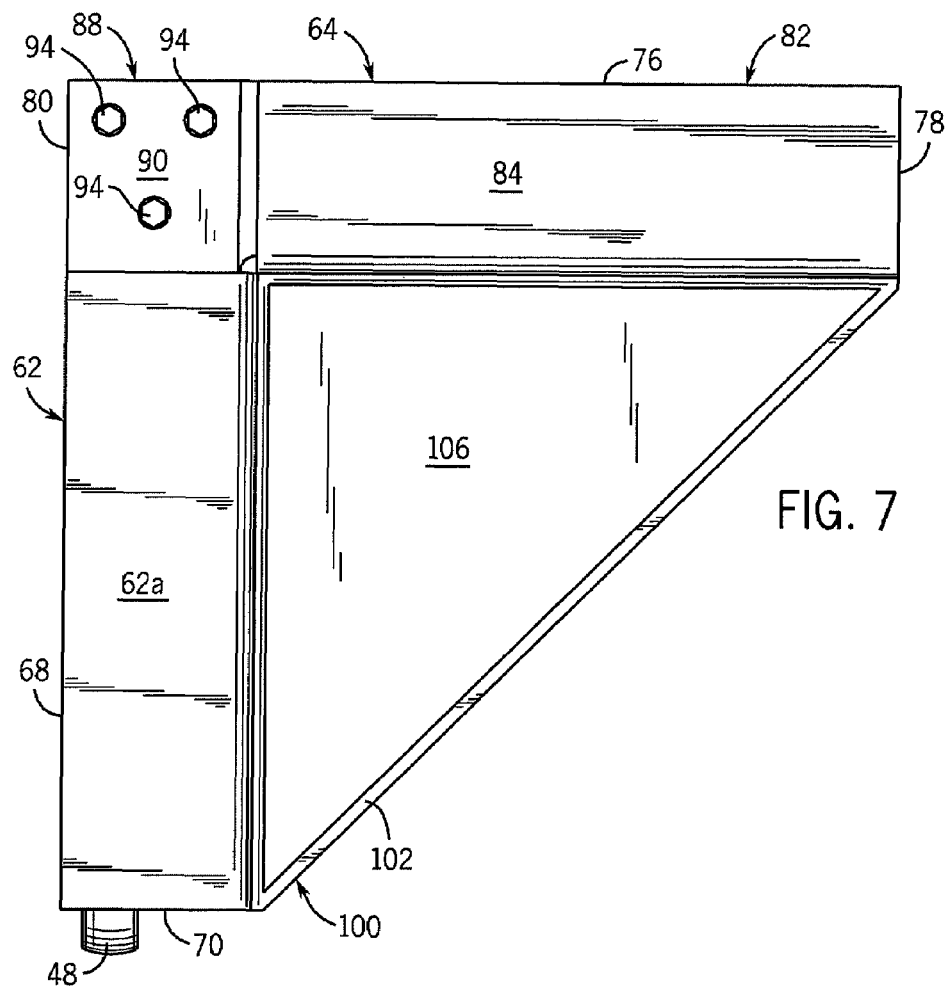
FIG. 7 is a top plan view of a caster assembly of FIG. 5.
Figure 8:
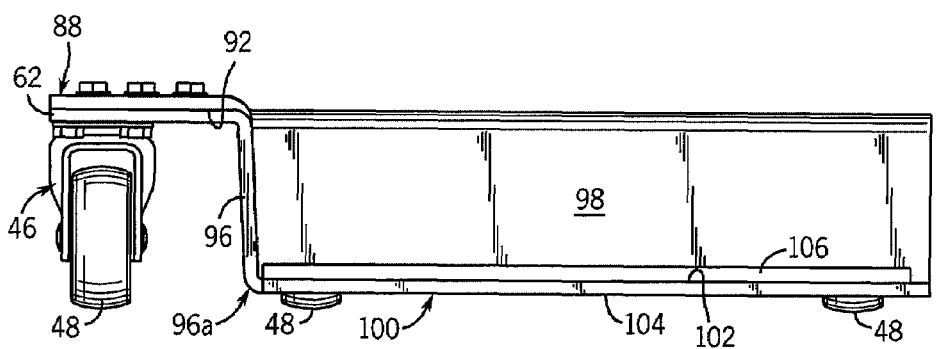
FIG. 8 is a side elevational view of the caster assembly of FIG. 5.
Figure 9:
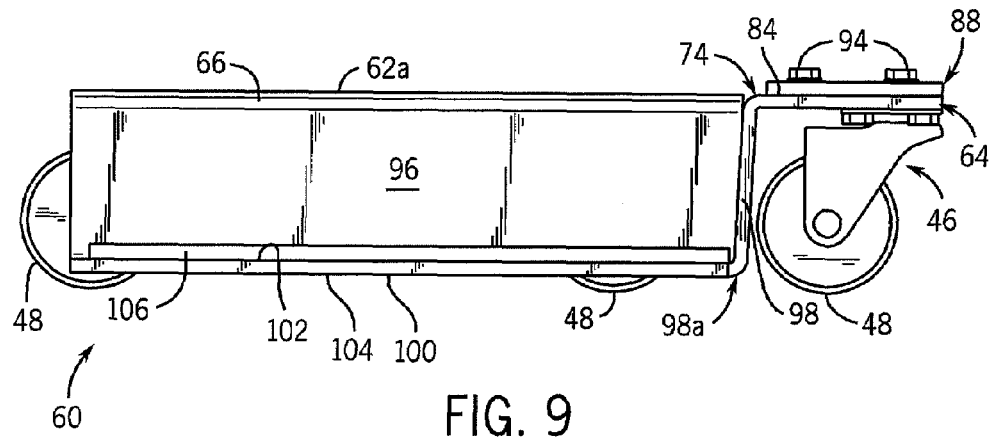
FIG. 9 is a side elevational view of a second side of the caster assembly of FIG. 5.
Figure 10:
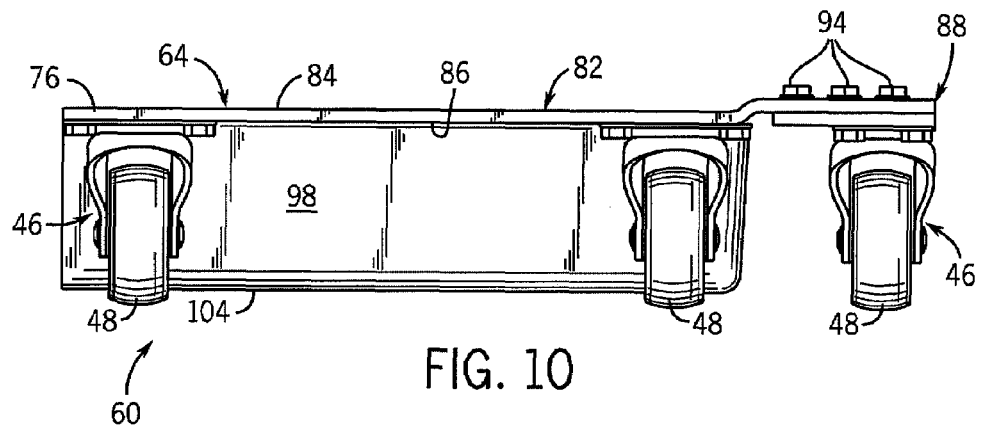
FIG. 10 is a side elevational view of a third side of the caster assembly of FIG. 5.
Figure 11:
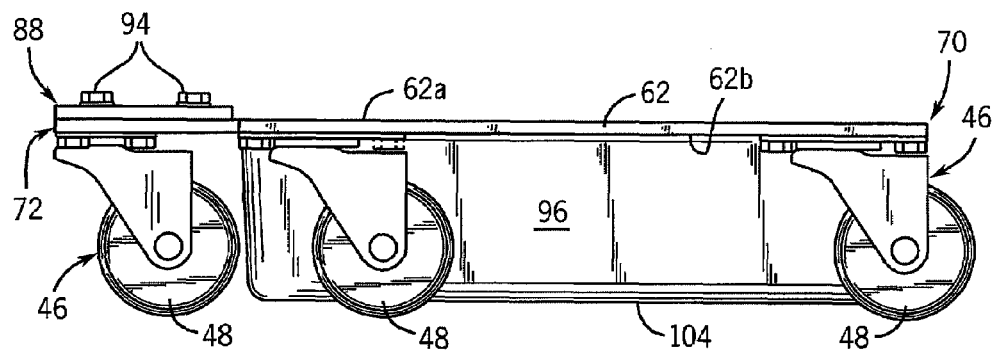
FIG. 11 is a side elevational view of a fourth side of the caster assembly of FIG. 5.
Figure 12:
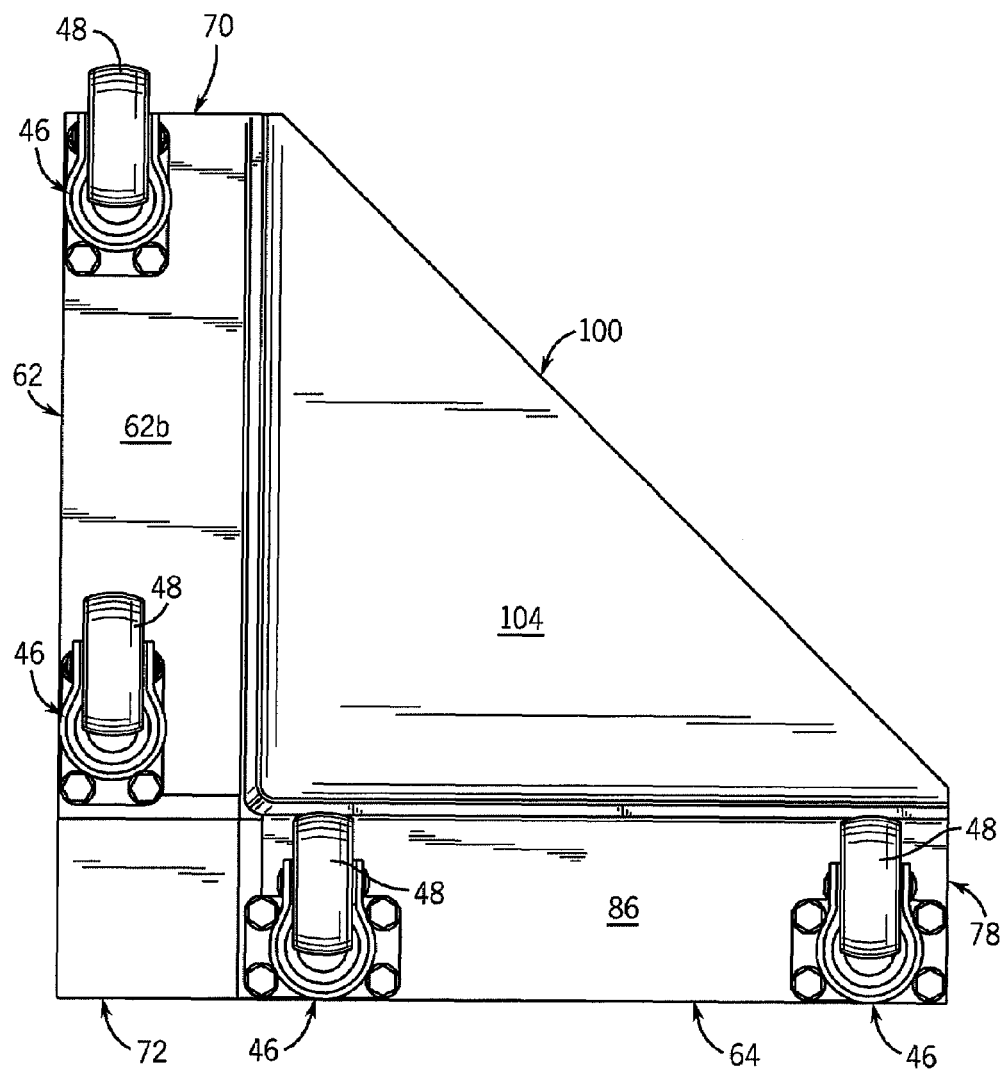
FIG. 12 is a bottom plan view of the caster assembly of FIG. 5.

Caster assembly 10 is defined by first and second legs 16 and 18, respectively, that are perpendicular to each other. Legs 16 and 18 are generally flat and include corresponding upper surfaces 16a and 18a, respectively, that are generally co-planar and lower surfaces 16b and 18b, respectively, that are also generally co-planar. First leg 16 is further defined by inner and outer edges 20 and 22, respectively, and first and second ends 24 and 26, respectively. Second end 26 of first leg 16 is integrally formed with second end 28 of second leg 18. Second leg 18 is further defined by inner and outer edges 30 and 32, respectively, and first end 34. First and second sidewalls 36 and 38 depend from corresponding inner edges 20 and 30, respectively, of first and second legs 16 and 18, respectively. Sidewalls 36 and 38 are generally perpendicular to each other and to first and second legs 16 and 18, respectively. Terminal ends 36a and 38a of sidewalls 36 and 38, respectively, are vertically spaced from corresponding inner edges 20 and 30 of first and second legs 16 and 18, respectively, and are interconnected to each other by landing 40. Landing 40 includes an upper surface 42 adapted for receiving a portion of bottom surface 12a of object 12 thereon and a lower surface 43. Landing 40 has a generally triangular shape and an outer edge 44. As best seen in FIG. 3, landing 40 lies in a plane generally parallel to and vertically spaced from first and second legs 16 and 18, respectively.

Caster assembly 10 further includes a plurality of caster wheel assemblies 46 mounted to lower surfaces 16b and 18b of first and second legs 16 and 18, respectively. Each caster wheel assembly 46 includes caster wheel 48 rotatably mounted on an axle 50 extending between a pair of generally parallel support arms 52. The axles 50 of caster wheel assemblies 46 preferably lie in a common axes plane. As is conventional, support arms 52 are rotatably mounted to a mounting plate in any conventional manner so as to allow support arms 52 to pivot about a vertical axis extending perpendicular to mounting plate 58. Mounting plates 58 of caster wheel assemblies 46 are mounted to lower surfaces 16b and 18b of first and second legs 16 and 18, respectively, in any conventional manner such as by rivets or the like.

In operation, object 12 is deposited on caster assembly 10 such that a portion of a lower surface 12a is received on upper surface 42 of landing 40. Landing 40 may be interconnected to lower surface 12a of object 12 if desired using an adhesive, fastening element such as a screw or the like, or in another manner customary in the trade. With object 12 supported on one or more caster assemblies 10, the one or more caster assemblies 10 may be used to move object 12 in a user desired direction to a user desired location. It can be appreciated that sidewalls 36 and 38, respectively, prevent lateral movement of object 12 as the one or more caster assemblies 10 are used to move object 12 in a user desired direction over supporting surface 14.

Referring to FIGS. 5-12, an alternate embodiment of a caster assembly in accordance with the present invention is generally designated by the reference numeral 60. It is intended that caster assembly 60 support an object 12 such as furniture, luggage, file cabinets or the like, above supporting surface 14. Caster assembly 60 is defined by first and second legs 62 and 64, respectively, that are perpendicular to each other. Leg 62 is generally flat and includes an upper surface 62a and a lower surface 62b. First leg 62 is further defined by inner and outer edges 66 and 68, respectively, and first and second ends 70 and 72, respectively.

Second leg 64 is defined by inner and outer edges 74 and 76, respectively, and first and second ends 78 and 80, respectively. Second leg 64 of caster assembly 60 includes a first generally flat portion 82 adjacent first end 78 thereof. First portion 82 lies in a common plane with first leg 62 and has a generally flat upper surface 84 and a generally flat lower surface 86. Second leg 64 further includes a generally flat second portion 88 disposed between first portion 82 and second end 80 of first leg 64. Second portion 88 of second leg 64 is vertically spaced from first portion 82 of second leg 64 and has a generally flat upper surface 90 and a generally flat lower surface 92 that overlaps a portion of first leg 62 adjacent second end 72 thereof. Second portion 88 of second leg 64 is interconnected to first leg 62 by a plurality of fasteners 94.

First and second sidewalls 96 and 98, respectively, depend from corresponding inner edges 66 and 74, respectively, of first and second legs 62 and 64, respectively. Sidewalls 96 and 98 are generally perpendicular to each other and to first and second legs 62 and 64, respectively. Terminal ends 96a and 98a of corresponding sidewalls 96 and 98, respectively, are vertically spaced from corresponding inner edges 66 and 74 of first and second legs 62 and 64, respectively, and are interconnected to each other by triangular landing 100. Landing 100 includes an upper surface 102 and a lower surface 104. It is contemplated to affix a generally triangular resilient pad 106 to upper surface 102 of landing 100, for reasons hereinafter described. Landing 100 lies in a plane generally parallel to and vertically spaced from first and second legs 62 and 64, respectively.

Caster assembly 60 further includes a plurality of caster wheel assemblies 46, hereinafter described. Mounting plates 58 of caster wheel assemblies 46 are mounted to lower surfaces 62b and 86 of first and second legs 62 and 64, respectively, in any conventional manner such as by rivets 108.

In operation, object 12 heretofore described may be deposited on resilient pad 106 of caster assembly 60 such that a portion of lower surface 12a of object 12 overlaps landing 100. Resilient pad 106 acts to limit damage to object 12 while being transported on caster assembly 60. Object 12 may be interconnected to landing 100 and/or resilient pad 106 by use of an adhesive, fastening screw element such as a screw or the like, or in other manners customary in the trade. With object 12 supported on one or more caster assemblies 60, the one or more caster assemblies may be used to move object 12 in the user desired direction to a user desired location. It can be appreciated that sidewalls 96 and 98 may prevent lateral movement of object 12 as the one or more caster assemblies 60 are used to move object 12 in the user desired direction over the supporting surface 14.

Various modes of carrying out the invention are contemplated as being within the scope of the following claims particularly pointing out and distinctly claiming the subject matter which is regarded as the invention.

I claim:

1. A caster assembly for supporting an object, comprising:
   a plurality of wheel assemblies; and
   a landing supported by the plurality of wheel assemblies for receiving the object thereon, the landing lying in a first plane extending through the plurality of wheel assemblies and includes first and second edges that are generally perpendicular to and intersect each other;
   a first sidewall extending from the first edge of the landing at an angle generally perpendicular to the landing, the first sidewall having inner and outer sides and terminating at an upper edge;
   a second sidewall extending from the second edge of the landing at an angle generally perpendicular to the landing, the second sidewall having inner and outer sides and terminating at an upper edge;
   a first leg extending from the upper edge of the first sidewall and lying in a second plane generally parallel to the first plane, the first leg having upper and lower surfaces; and
   a second leg extending from the upper edge of the second sidewall and lying in the second plane, the second leg having upper and lower surfaces; wherein:
   the plurality of wheel assemblies depend from the lower surfaces of the first and second legs;
   the landing extends from the inner side of the first sidewall in a first direction and from the second sidewall in a second direction;
   the landing has a generally triangular configuration;
   the first leg extends from the outer side of the first sidewall in a third direction that is generally opposite to the first direction; and
   the second leg extends from the outer side of the second sidewall in a fourth direction that is generally opposite to the second direction.

2. The caster assembly of claim 1 wherein each wheel assembly includes a corresponding caster wheel, the caster wheel rotatable about a corresponding axis.

3. The caster assembly of claim 2 wherein the axes of the caster wheels lie in a common axes plane.

4. The caster assembly of claim 1 wherein a first wheel assembly of the plurality of wheel assemblies is attached to the lower surface of the first leg and a second wheel assembly of the plurality of wheel assemblies is attached to the lower surface of the second leg.

5. A caster assembly for supporting an object, comprising:
   a first sidewall having inner and outer sides;
   a second sidewall having inner and outer sides;
   a landing extending between the inner sides of the first and second sidewalls for receiving the object thereon, the landing lying in a first plane;
   first and second legs:
   extending from the outer sides of the first and second sidewalls;
   lying in a second plane generally parallel to the first plane; and
   being vertically spaced from the landing, each leg including an upper surface and
   a lower surface;
   a first wheel assembly interconnected to the lower surface of the first leg; and
   a second wheel assembly interconnected to the lower surface of the second leg;
   wherein:
   the landing extends from the inner side of the first sidewall in a first direction and from the second sidewall in a second direction;
   the landing has a generally triangular configuration;
   the first leg extends from the outer side of the first sidewall in a third direction that is generally opposite to the first direction; and
   the second leg extends from the outer side of the second sidewall in a fourth direction that is generally opposite to the second direction.

6. The caster assembly of claim 5 wherein the landing includes first and second edges that are generally perpendicular to and intersect each other.

7. The caster assembly of claim 6 wherein the first sidewall extends from the first edge of the landing at an angle generally perpendicular to the landing, the first sidewall terminating at an upper edge.

8. The caster assembly of claim 7 wherein the second sidewall extends from the second edge of the landing at an angle generally perpendicular to the landing, the second sidewall terminating at an upper edge.

9. The caster assembly of claim 8 wherein the first leg extends from the upper edge of the first sidewall and the second leg extends from the upper edge of the second sidewall.

10. A caster assembly for supporting an object, comprising:
    a first sidewall having inner and outer sides and upper and lower edges;
    a second sidewall having inner and outer sides and upper and lower edges;
    a generally triangular landing extending between the inner sides of the first and second sidewalls and having first and second edges that are generally perpendicular to and intersect each other, the landing being generally perpendicular to the first and second sidewalls and receiving the object thereon;

a first leg extending from the outer side of the first sidewall at the upper edge of the first sidewall and lying in a second plane generally parallel to the first plane, the first leg having upper and lower surfaces;

a second leg extending from the outer side of the second sidewall at the upper edge of the second sidewall and lying in the second plane, the second leg having upper and lower surfaces;

a first wheel assembly interconnected to the lower surface of the first leg; and a second wheel assembly interconnected to the lower surface of the second leg wherein:

the landing extends from the inner side of the first sidewall in a first direction and from the second sidewall in a second direction;

the first leg extends from the outer side of the first sidewall in a third direction that is generally opposite to the first direction; and the second leg extends from the outer side of the second sidewall in a fourth direction that is generally opposite to the second direction.

11. The caster assembly of claim 10 wherein the landing lies in a first plane extending through the first and second wheel assemblies.

12. The caster assembly of claim 10 wherein each wheel assembly includes a corresponding caster wheel, the caster wheel rotatable about a corresponding axis.

13. The caster assembly of claim 12 wherein the axes of the caster wheels lie in a common axes plane.

* * * * *